Dec. 5, 1961  B. BOUET  3,011,575
AUXILIARY RUNNING GEAR INTENDED FOR FACILITATING
THE PARKING OF A MOTOR VEHICLE
Filed May 2, 1958  4 Sheets-Sheet 2
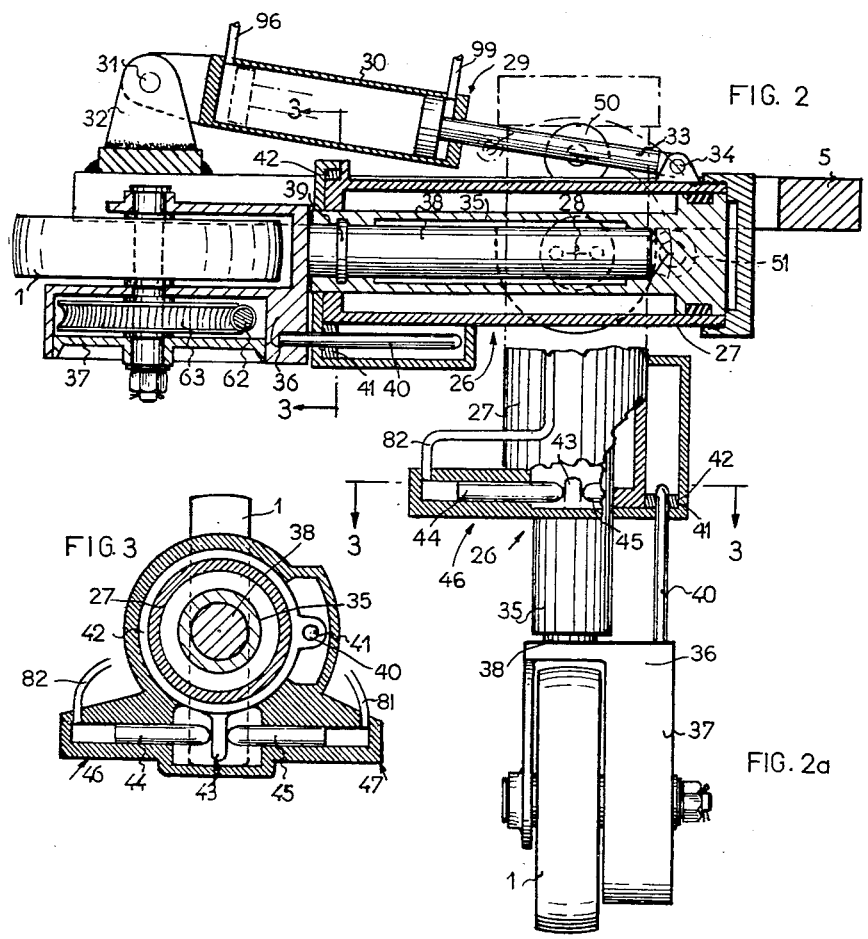
Inventor
B. Bouet Dec. 5, 1961    B. BOUET    3,011,575
AUXILIARY RUNNING GEAR INTENDED FOR FACILITATING
THE PARKING OF A MOTOR VEHICLE
Filed May 2, 1958    4 Sheets-Sheet 4
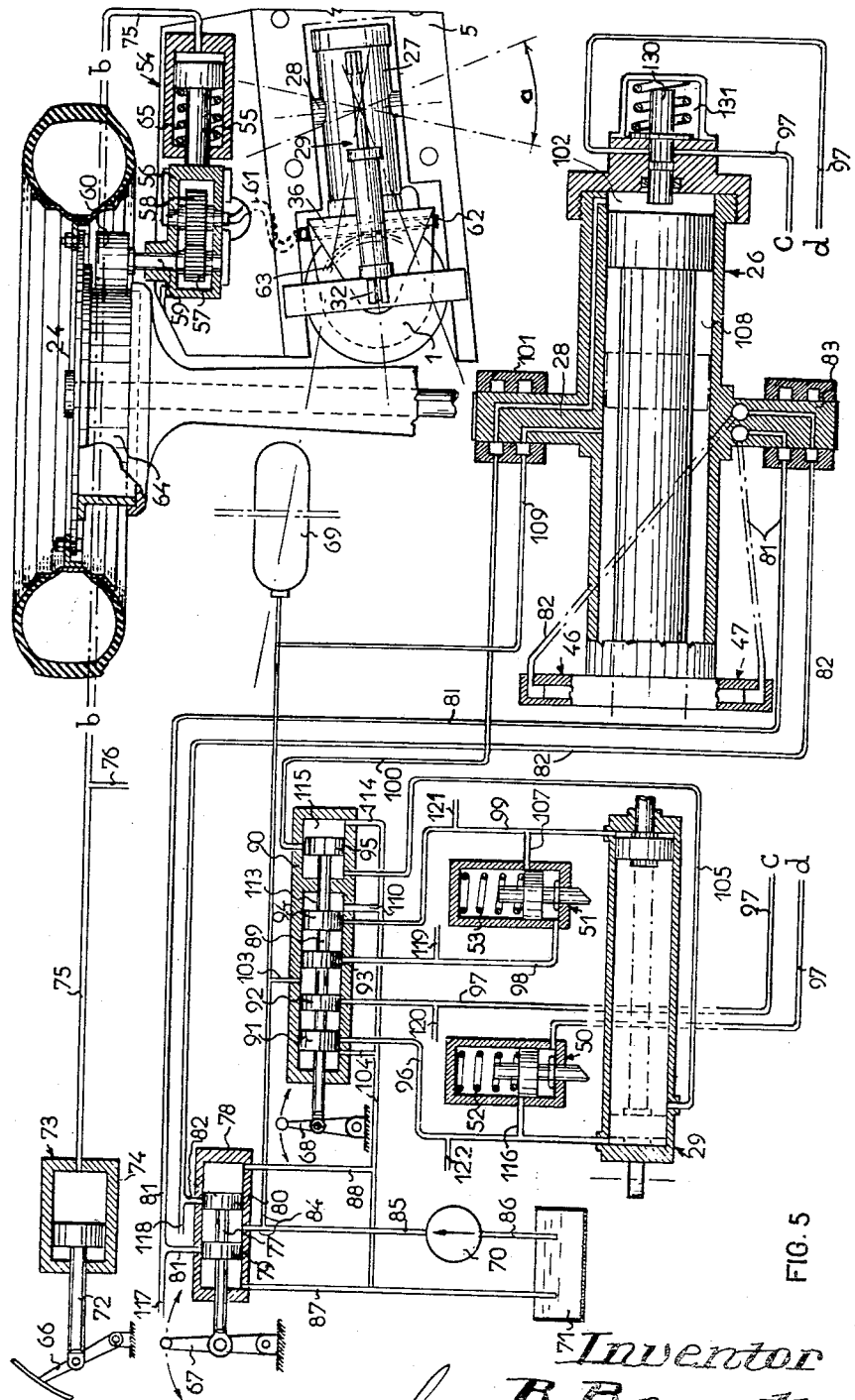
Inventor
B. Bouet
By Clarence Downing Seeble
Attys.

# United States Patent Office 3,011,575
Patented Dec. 5, 1961

3,011,575
AUXILIARY RUNNING GEAR INTENDED FOR FACILITATING THE PARKING OF A MOTOR VEHICLE
Bernard Bouet, 65 Rue de la Boetie, Paris 8, France
Filed May 2, 1958, Ser. No. 732,533
Claims priority, application France May 3, 1957
2 Claims. (Cl. 180—1)

The present invention relates to gear whereby a motor vehicle can be pivoted on the spot about one of its ends, more particularly for the purpose of facilitating parking of the said vehicle.

The rapid increase in the number of motor vehicles in circulation makes parking more and more difficult, more especially in large cities. In particular, when a driver finds a place where he can park his vehicle, there is generally only a narrow interval between two other vehicles, which obliges him to carry out a series of manoeuvres which entail the loss of time and many risks of accident. Also, it often happens that a parked vehicle cannot get out again due to incorrect appreciation of the necessary distance by another driver who has arrived in the meantime.

In order to overcome these disadvantages, it has already been proposed to provide motor vehicles with an auxiliary rear transverse wheel which is retractable and on which the rear of the vehicle can be allowed to rest temporarily, and which enables the vehicle to be pivoted on the spot about its front end, more particularly in order to draw up against the pavement or in order to get away from the pavement.

In this known device, it has been considered that when its rear end is rolled on an auxiliary transverse wheel of this kind, the vehicle naturally tends to pivot about a point situated in its longitudinal median plane, on a straight line perpendicular to the centre of the front wheels.

Now, in practice, this purely theoretical conception is very rarely observed. Motor vehicles are in fact mounted on tires and the latter rest on the ground, on zones of contact whose area varies in dependence on the distribution of loads, the degree to which the tires are inflated, the inclination of the ground surface, etc. As a result, in the majority of cases, the areas of the two front wheels in contact with the ground differ from one another; more particularly, when the vehicle is to be placed alongside a pavement, which constitutes the essential application of a device of this kind, owing to the fact that the road is generally cambered, the centre of gravity of the vehicle is shifted towards the pavement, so that the front tire situated nearest the pavement is flattened more than the other. Consequently, the zone of contact between this latter tire and the ground is smaller; thus the resistance to pivoting on the part of the wheel carrying the said tire is reduced, and the vehicle naturally tends to pivot about the said wheel.

Under these circumstances, it will be appreciated that the known device has a certain number of disadvantages:

First of all, the auxiliary transverse wheel, whose rolling axis extends in the longitudinal plane of symmetry of the vehicle tends to skid and opposes natural pivoting. Owing to the fact that at the time of pivoting, the rear of the vehicle rests on the single central wheel, there is also a risk of the vehicle becoming unbalanced. Finally, and more particularly, if the front wheels are not directed strictly in a straight line, it is impossible to calculate in advance the exact path of travel which the vehicle will take when pivoted about its front end.

The object of the invention is to overcome all these disadvantages and to facilitate pivoting movements further, more particularly by giving the vehicle a well-defined centre of pivoting which also corresponds to its natural tendency.

For this purpose, the invention relates to a retractable auxiliary running gear comprising at least one wheel which can be directed selectively towards the centre of natural pivoting constituted by the zone of contact between one or other of the front wheels and the ground.

According to a further feature of the invention, two auxiliary wheels are provided symmetrically one on either side of the longitudinal central plane of the vehicle, which ensures perfect balancing of the rear of the vehicle when the latter is pivoted about one of the front wheels.

According to the invention, each of the auxiliary wheels is orientatable between two positions, in each of which its rolling axis passes through a point situated vertically of the zone of contact with the ground of one of the front wheels, and means are provided for acting simultaneously on the two auxiliary wheels, so as to dispose them in one or other of two arrangements in each of which their rolling axes intersect above one front wheel.

In these conditions, in each of the said arrangements, the auxiliary wheels can describe two arcs whose common centre is a point situated vertically of the zone of contact between the ground and the selective front wheel.

In the usual case of parking a vehicle alongside the pavement at a cambered road surface, the choice in question will of course fall on the front wheel which is furthest from the pavement, for it is about this wheel that the vehicle naturally tends to pivot, as already indicated.

The invention also relates, independently of the general features mentioned hereinbefore, to a certain number of original constructional features concerning, more particularly, a hydraulic control mechanism for the selective orientation of the auxiliary wheels, means for driving the said auxiliary wheels from the normal driving wheels of the vehicle, said means guaranteeing that the said auxiliary wheels will operate despite the orientatability of the auxiliary wheels, and a device which selectively makes it possible to bring the auxiliary wheels into operation or to retract them.

It is particularly proposed, according to the invention, to carry out all these operations by means of an original hydraulic system a detailed description of which will be given hereinafter.

According to one feature of this hydraulic system, the bringing out of the auxiliary running gear, its orientation and bringing into operation, from the rear wheels, are effected by three separate control members, which el'm'nates practically all risks of the system coming into action accidentally when the vehicle is running normally.

According to a further feature of the invention, the retraction and the putting into place of the auxiliary device are effected in two stages, namely: a swinging movement and a vertical translational movement carried out by two separate hydraulic jacks. This arrangement makes it possible to reduce the bulk of the control system in the vertical sense to a minimum.

According to a further feature of the invention, the device comprises means for locking the auxiliary running gear both in the retracted position and in the operative position.

It is particularly proposed to use, for this purpose, automatic locking means of the half-turn lock bolt type, which are released at the desired instant.

In one preferred form of embodiment, the hydraulic control device effects successively, in this order and in response to a single manipulation by the operator, in one direction, unlocking, swinging into the vertical position, locking and bringing into the operative position, and, in the other direction, retraction, unlocking, swinging to the horizontal position, and locking.

It is also possible, without departing from the scope of the invention, to reverse the described device, that is to say to provide auxiliary wheels at the front and to pivot the vehicle about the zone of contact between the ground and one of the rear wheels. It is also possible to provide at the same time two auxiliary front wheels and two rear auxiliary wheels, and to make the vehicle pivot about one or other of its ends selectively.

The invention will be better understood from reading the detailed description which follows and examining the accompanying drawings which illustrate, by way of non-limitative example, one form of embodiment of the invention.

In these drawings:

FIG. 2 is an elevational view, partly in section taken on the line 2—2 of FIG. 4, of the device for controlling the retraction of and putting into operation one of the auxiliary wheels the latter being illustrated in the retracted position.

FIG. 2a is an elevational view of the same auxiliary wheel in the operative position.

FIG. 3 is a sectional view taken on the lines 3—3 of FIGS. 2 and 2a.

FIG. 5 is a general diagrammatic view of the hydraulic control system according to the invention, and FIG. 6 is a plan view, seen from above, of the drive take-off mechanism with hydraulic control.

Figure 1:
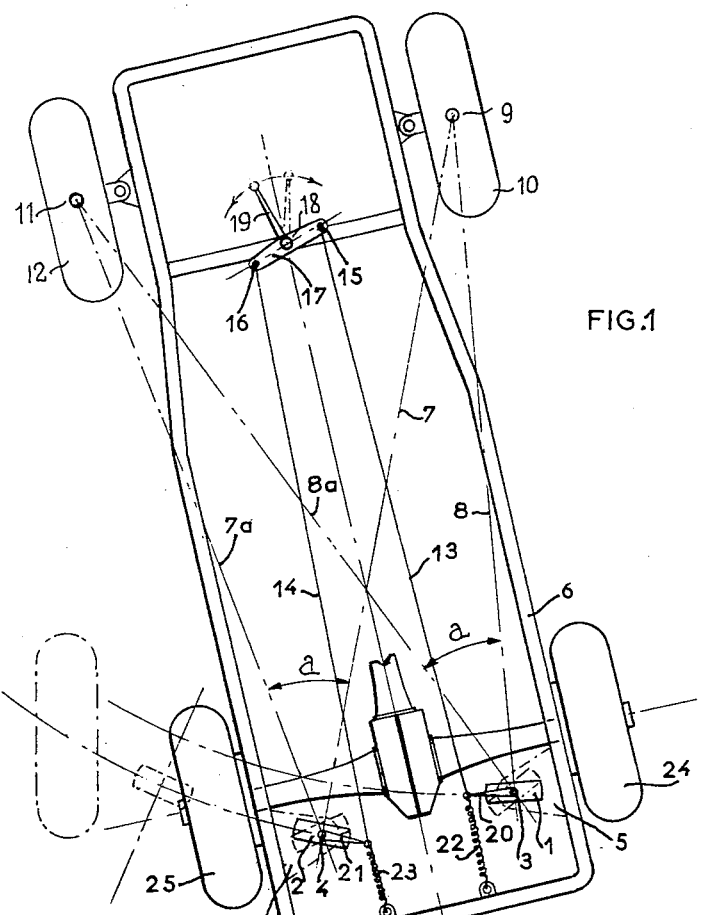
FIG. 1 is a diagrammatic plan view of a vehicle equipped with the parking device according to the invention.

In the form of embodiment illustrated in FIG. 1, the device according to the invention comprises essentially two small auxiliary driving wheels 1 and 2 which are mounted pivotally on substantially vertical pins 3 and 4, on supports 5 which are fast for example with the chassis 6 of the vehicle.

In the position illustrated in full lines in the figure, the wheels 1 and 2 are orientated in such a manner that their rolling axes 8 and 7 intersect at 9, at a point situated vertically above the zone of contact between the ground and the tire of one of the front wheels 10 of the vehicle. In their position illustrated in broken lines, the wheels 1 and 2 are orientated in such a manner that their rolling axes, designated this time by the reference numerals 8a and 7a, intersect at 11, at a point situated vertically above the zone of contact between the ground and the tire of the other front wheel 12 of the vehicle.

According to the invention, means are also provided for shifting the wheels 1 and 2 from their position shown in full lines to their position illustrated in broken lines, or vice versa, according to the wish of the driver. In FIG. 1, these means are indicated diagrammatically by the cables 13 and 14 which are anchored at one end, as indicated at 15 and 16, to the two opposite arms of a rocker 17 which is articulated at 18 about a substantially vertical axis on the chassis 6, and fast with a hand control lever 19. At their opposite ends, the cables 13 and 14 are respectively anchored to the arms of levers 20 and 21, which are respectively fast with the pivot pins 3 and 4 of wheels 1 and 2. Draw springs 22 and 23 continually urge the lever arms 20 and 21 and, consequently, the wheels 1 and 2, in the counter-clockwise direction (in the figure) and hold the cables 13 and 14 tensioned. In these conditions, it will be seen that by passing the control lever 19 from the position illustrated in full lines to the position shown in chain-dotted lines, the rocker 17 is rocked through an angle a which, if the arms 20 and 21 and the arms of the rocker are equal, will be equal to the angular distance a which separates the positions 8 and 8a of the rolling axis of the wheel 1 and also the positions 7 and 7a of the rolling axis of the wheel 2. In these conditions, the cable 13 releases the spring 22, which pivots the wheel 1 through the said angle a, whilst the cable 14 pivots the wheel 2 through the same angle in opposition to the action of the spring 23. The same process takes place in the reverse sense when the control lever 19 is returned from the position shown in chain-dotted lines to the position shown in full lines. It will be seen that the first operation described has the result of finally switching the intersection of the rolling axes 8 and 7 from the point 9 to the point 11, whilst the second returns the said intersection from the point 11 to the point 9. In particular, it is thus possible for the driver of the vehicle, when he wishes to park at the side of a cambered road, to select the natural pivoting centre of the vehicle, namely in the present case the zone of contact between the ground and the front wheel furthest from the pavement (10 in the example illustrated in FIG. 1). It is then sufficient to lower the wheels 1 and 2 on to the ground, and then to lift the vehicle so that it rests on the ground only by the said wheels, and to drive the latter in rotational movement in the desired direction in order to pivot the whole vehicle about the point 9. During this manoeuvre, the wheel 12, if it is aligned rectilinearly, rolls without difficulty along an arc of a circle whose centre is the point of the zone of contact between the ground and wheel 10 situated on the same vertical as the common centre of rolling 9 of the auxiliary wheels 1 and 2. Moreover, even if the front wheels are slightly deflected, the length of the radii of pivoting of the auxiliary wheels 1 and 2, greater than the distance separating the zones of contact between the ground and the two front wheels, obliges the vehicle none the less to pivot about the point 9, the wheel 12 then skidding slightly.

It will be noted that the pivot pins 3 and 4 of the wheels 1 and 2 are arranged symmetrically relatively to the longitudinal median plane of the vehicle, at a sufficient distance from this plane to ensure good balancing of the rear end of the vehicle during pivoting. Owing to this, it should be noted that, irrespective of the centre of pivoting which is selected (9 or 11) the radii of pivoting of the wheels 1 and 2 are consequently necessarily different. In particular, in the arrangement illustrated in full lines in FIG. 1, the radius of pivoting of the wheel 2 is larger than that of the wheel 1. As a result, pivoting about the pin 9 through the same angle as the wheel 1, the wheel 2 will have to travel over a long distance. Since generally these wheels will be selected to have the same radius, the wheel 2 will necessarily turn faster than the wheel 1. This is why, although it would of course be possible to drive the wheels 1 and 2 from an auxiliary motor, it is particularly proposed according to the invention to drive the wheel 1 from the normal adjacent rear wheel 24 of the vehicle, and to drive the other auxiliary wheel 2 from the other normal rear wheel 25 of the vehicle. This arrangement in fact makes it possible to profit from the action of the differential of the vehicle which permits the auxiliary wheels to rotate at different speeds without ceasing to be simultaneously driven.

It will also be noted in FIG. 1 that the device according to the invention considerably facilitates parking manoeuvres. In fact, since the device makes it possible to cause the vehicle to pivot about the front wheel furthest from the pavement, it is possible to park without any preliminary tentative efforts, as near to the vehicle in front as may be desired, and also substantially level with the pavement, by bringing the said front wheel substantially immediately behind the rear outer wheel of the said vehicle in front of the vehicle being parked (provided, of course, that the two vehicles have a substantially similar wheel base).

Figure 4:
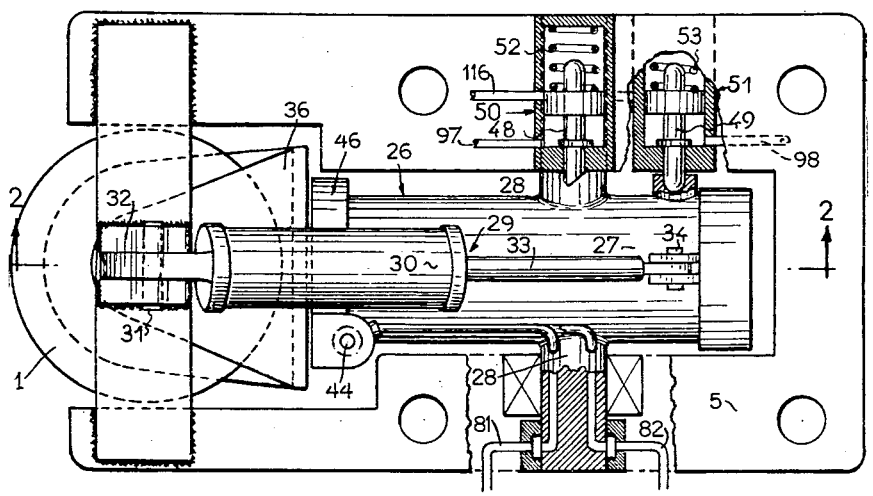
FIG. 4 is a plan view seen from above, corresponding to FIG. 2.

In the form of embodiment shown in FIGS. 2 to 4, each of the auxiliary wheels, for example 1, is mounted on a telescopic leg constituted by a hydraulic jack designated by the general reference numeral 26, comprising a cylinder 27 articulated about a pin 28 on the support 5, so that the assembly can pivot between a horizontal retracted position illustrated in FIG. 2 and a vertical position illustrated in FIG. 2a. This pivoting movement is effected by a second jack, designated generally as 29, whose cylinder 30 is articulated at 31 on a strap 32 fast with the support 5 and whose piston rod 33 is articulated at 34 to the cylinder 27 of the jack 26. In its turn, the piston rod 35 of the jack 26 is fast in translational movement with a strap 36 on which is mounted the wheel 1 and which carries a gear case 37 wherein is housed some of the driving members for the wheel 1 (described hereinafter in detail). The strap 36 is mounted on a pivot 38 which is journalled in the piston rod 35. The collar 39 of the pivot 38, lodged in a corresponding groove of the piston rod 35, permits the strap 36 to pivot in the said piston rod, thus remaining fast in translational movement therewith. Finally, the strap 36 carries an entrainment finger 40 which can slide in an eye 41 of a ring 42 which also comprises a radial tongue 43 arranged between two plunger pistons 44, 45 of pivoting jacks designated respectively by the reference numerals 46 and 47 and which act together in the manner of a double-acting jack.

The features described hereinbefore together permit, by appropriate selective hydraulic control of the jacks 29, 26, 46 and 47, the wheel 1 to be brought from the retracted position shown in FIG. 2 into the operative position shown in FIG. 2a, by pivoting the telescopic leg about the pin 28, followed by extending the said leg and orientating the wheel 1 selectively in one or other of two positions corresponding to pivoting the vehicle about one or other of the front wheels, as described hereinbefore with reference to FIG. 1. As will readily be appreciated from FIGS. 2 and 2a, bringing the device into position in two stages has the advantage of considerably reducing bulk in the vertical sense, particularly above the floor of the vehicle, whilst retraction by simple vertical sliding would entail the provision of a bulky column within the interior of the vehicle since, as will readily be appreciated, it is essential to retract the auxiliary wheels sufficiently from the road surface to prevent any accident.

The device according to the invention is also provided with means for locking the running gear both in the operative position and in the retracted position. In the form of embodiment of FIGS. 2 and 4, these means are constituted by two piston rods 48 and 49 of two jacks designated by the general reference numerals 50 and 51. Springs 52 and 53 continually urge the rods 48 and 49 towards their out position. The operative ends of these rods are bevelled so that they can be retracted, in opposition to the action of their springs, by the arrival on the cylinder 27 of the jack 26, respectively in the vertical position and in the horizontal position, in the manner of a half-turn lock bolt. This arrangement permits automatic locking in one or other of the said positions, whilst unlocking is effected, as explained hereinafter, by putting the appropriate jack 50 or 51 under pressure.

FIG. 6 illustrates a form of embodiment of a device for taking off drive from one of the normal rear wheels 24 of the vehicle. This device comprises a jack designated generally by the reference numeral 54, whose piston rod 55 carries a gear case 56 which contains two constant-mesh pinions 57 and 58, the smaller of these pinions being keyed on a shaft 59 which also carries a friction roller 60, whilst the other is fast in rotation with the core of a flexible sheated cable 61, which transmits the rotational movement of this pinion to a tangential worm 62 (see also FIG. 2) meshing with a helical toothed wheel 63 fast in rotation on the same shaft as the auxiliary wheel 1. The worm 62 and the toothed wheel 63 are mounted in the case 37 (see also FIG. 2). The friction roller 60 can be brought into contact with the brake drum 64 of the normal rear wheel 24 when the jack 54 is put under pressure. A spring 65 urges the gear case 56 and consequently the roller 60, constantly towards the disengaged position.

FIG. 5 shows diagrammatically a hydraulic control system for the actuation of the various hydraulic jacks mentioned hereinbefore, and consequently for operating the general device. In the system shown in FIG. 5, there are provided three separate control members, namely: a pedal 66 and two hand control levers 67 and 68 which effect, respectively, the connecting-up of the auxiliary wheels, their orientation and their bringing into operation in two stages in the manner described hereinbefore.

The hydraulic system comprises a source of liquid under pressure such as an oil-pneumatic accumulator 69, whose oil reserve is continually maintained by a pump 70 from a reservoir 71.

The pedal 66 controls the piston rod 72 of a jack 73 whose cylinder 74 communicates permanently through a conduit 75 with the cylinder of the jack 54 and by a conduit 76 with the cylinder of the jack similar to 54 (not shown) which controls the connecting-up of the auxiliary wheel 2. The conduits 75 and 76, and the compartments communicating therewith of the control jack 73 and the controlled jacks, permanently contain a liquid column of such length that when the pedal 66 is pressed inwards the result is obtained, owing to the transmission effected by this column, of a sufficient displacement of the piston rod 55 and the piston rod of the jack for connecting-up the auxiliary wheel 2, to bring the rollers such as 60 into contact with the brake drums such as 64.

The control lever 67 is articulated to the slide 77 of a distributing slide valve 78. The slide 77 comprises two valve members 79 and 80 which, in the neutral position illustrated in FIG. 5, block the conduits 81 and 82 respectively. The conduits 81 and 82, through the intermediary of a rotating packing 83, feed the orientation jacks 46 and 47. The compartments between the two valve members 79 and 80 are in permanent communication through a conduit 84 with the accumulator 69, whilst a branch pipe 85 connects the said conduit 84 to the pump 70, which is itself supplied from the reservoir 71 through a conduit 86. Finally, the two end compartments of the distributing slide valve 78 communicate permanently with the reservoir 71 through evacuation conduits 87 and 88 which are arranged in parallel.

The control lever 68 is articulated on the slide 89 of a distributing slide valve 90. The slide 89 comprises five valve members 91, 92, 93, 94 and 95. In the neutral position illustrated in FIG. 5, the valve member 91 obturates a bleed conduit 96 of the jack 29 for pivoting the auxiliary wheel 1; the valve member 92 blocks a conduit 97 which feeds the jack 50 controlling the means for locking in the vertical position the mobile assembly carrying the auxiliary wheel 1. The conduit 97 is also controlled by an auxiliary distributing slide valve 130 which is continually urged by a spring 131 towards a position in which it blocks the said conduit but which opens the latter automatically under the control of the jack 26 when the telescopic leg is completely retracted. The valve member 93 obturates a conduit 98 communicating with the jack 51 which controls the release of the device for locking the said mobile assembly in a retracted position; the valve member 94 obturates a conduit 99 supplying the jack 29 for pivoting the auxiliary wheel 1, and the member 95 obturates a conduit 100 which, through the intermediary of a rotatable packing 101, communicates with the large compartment 102 of the jack 26 controlling the extension or retraction of the telescopic leg which carries the auxiliary wheel 1, which jack, in the example illustrated, is of the differential type. A branch 103 of the conduit 84 allows permanent communication between the compartment between the valve members 92 and 93 and the accumulator 69 and pump 70.

An evacuation conduit 104, arranged in parallel with the conduits 87 and 88, terminates in the extreme left-hand end compartment of the distributing slide valve 90. A further branch 110 from the same conduit terminates in its right-hand end compartment 113, whilst a further branch 114 from the same conduit terminates in a separate chamber 115 to the right of the member 95, at the left of which terminates a conduit 105 communicating with the jack 29 at a point situated in the vicinity of the evacuation conduit 96 of the said jack.

In the operative position illustrated in FIG. 5, the piston of the jack 50, effecting the unlocking of the telescopic leg from the vertical position, obturates a branch pipe 116 communicating with the conduit 96, whilst the piston of the jack 51 for unlocking from the horizontal position obturates a branch pipe 107 communicating with the conduit 99.

The annular compartment 108 of the differential jack 26 communicates permanently through the rotating packing 101 and, through the intermediary of a conduit 109 and conduits 84, 85 already mentioned, with the accumulator 60 and the pump 70.

Of course the other auxiliary wheel 2 is associated with control and unlocking means identical to those which have been described hereinbefore with reference to the auxiliary wheel 1. These means are fed and bled in parallel with those of the auxiliary wheel 1. More precisely, the branch pipes 117 and 118 feed jacks for orientating the auxiliary wheel 2 from conduits 81 and 82 respectively. Branch pipes 119 and 120 supply the unlocking jacks from conduits 98 and 97 and a branch pipe 121 supplies the pivoting jack from the conduit 99, the subjection to pressure or the discharge of the large compartment of the differential jack controlling the telescopic leg of the wheel being of course effected from its pivoting jack, as in the case of the auxiliary wheel 1, the pivoting jack being discharged through a branch pipe 122 of the conduit 96.

The device operates in the following manner:

When the driver wishes to bring into use the parking device according to the invention, he first of all pivots the lever 68 towards the right (in FIG. 5). The conduit 103 is put in communication with the supply conduit 98 to the jack 51. The piston of the latter is repelled against the action of its spring 53, which releases the bolt constituted by the rod of the said piston, so that the telescopic leg carrying the auxiliary wheel 1 is released. The same operations are produced simultaneously regarding the auxiliary wheel 2. In withdrawing, the piston of the jack 51 uncovers the orifice of the branch pipe 107, so that the pivoting jack 29 is supplied in its turn. Since also the discharge conduit 96 of this jack then communicates with the discharge branch pipe 104, owing to the displacement towards the right of the valve member 91 of the slide 89 of the distributing slide valve 90, the said jack is actuated; the piston rod 33 of the said jack returns into its cylinder and pivots the telescopic leg towards the vertical position. At the instant when this phase is concluded, the keeper associated with the bolt controlled by the jack 50 automatically retracts the piston of the said jack which, under the action of its spring 53, engages the said keeper and locks the telescopic leg in the said vertical position. At the same time, the piston of the jack 29 passes beyond the conduit 105 and the latter, which communicated up to that time with the discharge conduit 96, is put in communication with the conduit 99. Since it also communicates itself with the conduit 100, owing to the displacement towards the right of the valve member 95 of the distributing slide valve 90, the large compartment 102 of the differential jack 26 is in its turn subjected to pressure. The piston of the said jack, subjected differentially to the same pressure on its two faces, is displaced towards the smaller face and extends the telescopic leg. The auxiliary wheel 1 is then brought into contact with the ground and then, as the telescopic leg continues to extend, the vehicle is lifted.

The same sequence of operations is of course effected simultaneously at the auxiliary wheel 2 so that, finally, the rear end of the vehicle rests only on the auxiliary wheels.

If, for example, the driver wishes to park to the right, he must preferably orientate the auxiliary wheels 1 and 2 so that their rolling axes intersect above the point of contact between the front left wheel and the ground, as indicated hereinabove with reference to FIG. 1. For this purpose it will be sufficient to actuate the lever 67 in the desired direction to bring one of the orientation jacks 46, 47 into communication with the supply conduit 84 and the other with one of the discharge conduits 87, 88. It will be noted that if the lever 67 is then returned into the neutral position illustrated in FIG. 5, the said jacks are hydraulically locked so that the orientation of the auxiliary wheels cannot be modified accidentally during manoeuvring. All that remains to the driver is to press on the pedal 66 to connect-up the auxiliary wheels 1 and 2 respectively, and simultaneously, with the rear wheels 24 and 25.

It should be noted that it may be advantageous to proceed with orientating the auxiliary wheels when the vehicle is not yet resting entirely on them, that is to say either during the course of the stage of pivoting the telescopic leg or during the initial part of its extension travel. In fact, during these periods the auxiliary wheels 1 and 2 are suspended off the ground and consequently pivot without encountering any resistance.

It will also be noted that the bringing of the lever 68 into a neutral position effects hydraulic locking of all the jacks controlling the telescopic legs, which increases the safety ensured by the bolts 50 and 51.

It could be noted that during the pivoting stage the conduit 105 communicates, through the intermediary of the conduit 100, with the compartment 102 of the jack 26, but since it also communicates with discharge through the conduits 96 and 104, and since the annular compartment 108 of the jack 26 is permanently under pressure, no liquid can be sent into the compartment 102 during this period, so that the telescopic leg cannot begin to extend except when its pivoting movement is completed.

In order to retract the auxiliary running gear, it is sufficient to swing the lever 68 towards the left (FIG. 5). The conduit 100, connected to the compartment 102 of the jack 26 is then connected to discharge by the conduits 114 and 87 and, the pressure no longer prevailing except in the annular compartment of the jack 26, the telescopic leg retracts. At the same time, the swinging of the lever 68 has the result of connecting to discharge the conduit 99 through the intermediary of conduits 110, 104 and 87, whilst the conduit 97 of the jack 50 is supplied but the distributing slide valve 130 obturates the said conduit in order to prevent the actuation of the jack 50 whilst the telescopic leg is not completely retracted. When this retracting operation is completed, the distributor 130 is actuated by the piston of the jack 26 and the jack 50 is supplied, which effects the unlocking of the telescopic leg and then, through the intermediary of the branch pipe 116 and the conduit 96, then separated from the discharge line by the valve member 91, the supply of liquid under pressure to the left-hand side of the piston of the jack 29 (in the figure).

When the telescopic leg is completely retracted, the discharge flow through the jack 29 ceases and the liquid under pressure sent through the conduit 96 displaces the piston of the jack 29 towards the right (in FIG. 5). The rod 33 pivots the telescopic leg, then unlocked, as indicated hereinbefore, and returns it to the horizontal position. This operation is completed by the automatic engagement of the bolt controlled by the jack 51.

The invention is of course in no way limited to the example described and illustrated; it is capable of many modifications within the scope of any person skilled in the art, without however departing from the scope of the invention.

What is claimed is:

1. A parking device for a motor vehicle having a body supported by a pair of running wheels and a pair of driving wheels, and a liquid pressure source carried by said body, said device comprising, in combination, two hydraulic cylinders positioned under said body and mounted for swinging movement between a vertical operative position and a horizontal inoperative position, two cylinder and piston devices, means connecting each of said cylinder and piston devices with each of said hydraulic cylinders, respectively, and with the vehicle body, and movable under liquid pressure to swing the corresponding hydraulic cylinder between said two positions thereof, a piston rod means reciprocable in each of said hydraulic cylinders, respectively, between a retracted position and an extended position, an auxiliary wheel carried by each of said piston rod means to engage the ground and clear said pair of driving wheels of the ground when said hydraulic cylinders are moved into their operative position and said piston rod means into their extended position, liquid pressure responsive means, means connecting said liquid responsive means with said piston rod means and said liquid pressure responsive means being movable under liquid pressure to rotate the piston rod means between a position in which the axes of said auxiliary wheels, when said hydraulic cylinders are in said operative position thereof, pass through a point located above the contact area between the ground and one wheel of said pair of running wheels and a position in which said axes pass through a point located above the contact area between the ground and the other wheel of said pair of running wheels, means to drive each of said auxiliary wheels from one of said driving wheels, respectively, first controllable means for introducing pressure liquid from said source into said cylinder and piston devices and subsequently into said hydraulic cylinders for first causing said cylinder and piston devices to swing said hydraulic cylinders from inoperative to operative position and then cause said piston rod means to move from retracted to extended position, second controllable means for conducting pressure liquid from said source to said pressure responsive means to rotate said piston rod means in unison between said two positions thereof, and third controllable means to establish a driving connection between said driving means of the auxiliary wheels and said driving wheels of the vehicle.

2. A parking device according to claim 1, in which the outer wall of each hydraulic cylinder is provided with two axially spaced recesses, said device further comprising a first locking dog engageable in one of said recesses of each cylinder to hold the latter in said inoperative position thereof, a second locking dog engageable in the other recess of each cylinder to hold the latter in said operative position thereof, and operating means for withdrawing said dogs from said recesses in properly timed relation with the movements of said cylinder and piston devices.

References Cited in the file of this patent

UNITED STATES PATENTS

| | | |
|---|---|---|
| 1,387,626 | Swanson | Aug. 16, 1921 |
| 1,703,070 | Barshell | Feb. 19, 1929 |
| 1,804,887 | Miller | May 12, 1931 |
| 1,977,833 | Mortensen | Oct. 23, 1934 |
| 2,024,844 | Berman | Dec. 17, 1935 |
| 2,091,326 | Mardovin | Aug. 31, 1937 |
| 2,358,592 | Quinn | Sept. 19, 1944 |
| 2,685,934 | Coloma | Aug. 10, 1954 |
| 2,840,174 | Rector | June 24, 1958 |
| 2,872,991 | Collins | Feb. 10, 1959 |

FOREIGN PATENTS

| | | |
|---|---|---|
| 857,301 | France | Apr. 15, 1940 |
| 456,390 | Germany | Feb. 22, 1928 |
| 208,559 | Great Britain | June 26, 1924 |